(12) United States Patent
Chiu et al.

(10) Patent No.: US 11,210,475 B2
(45) Date of Patent: Dec. 28, 2021

(54) ENHANCED ATTENTION MECHANISMS

(71) Applicant: Google LLC, Mountain View, CA (US)

(72) Inventors: Chung-Cheng Chiu, Sunnyvale, CA (US); Colin Abraham Raffel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 16/518,518

(22) Filed: Jul. 22, 2019

(65) Prior Publication Data
US 2020/0026760 A1     Jan. 23, 2020

Related U.S. Application Data

(60) Provisional application No. 62/702,049, filed on Jul. 23, 2018.

(51) Int. Cl.
  *G06F 17/00* (2019.01)
  *G06F 40/40* (2020.01)
  *G06N 3/04* (2006.01)

(52) U.S. Cl.
  CPC ........... *G06F 40/40* (2020.01); *G06N 3/0445* (2013.01); *G06N 3/0454* (2013.01)

(58) Field of Classification Search
  CPC ........ G06F 16/345; G06F 40/20; G06F 40/40; G06N 3/0445; G06N 3/0454; G06N 3/0472; G06N 3/084
  USPC .............................................................. 704/9
  See application file for complete search history.

(56) References Cited

U.S. PATENT DOCUMENTS

| | | |
|---|---|---|
| 5,588,091 A | 12/1996 | Alkon et al. |
| 6,601,052 B1 | 7/2003 | Lee et al. |
| 9,705,904 B1 | 7/2017 | Davis et al. |
| 10,169,656 B2 | 1/2019 | Song et al. |
| 10,346,524 B1 * | 7/2019 | Zheng ................ G06N 3/0454 |
| 10,366,166 B2 * | 7/2019 | Yu ........................ G06N 3/0445 |

(Continued)

OTHER PUBLICATIONS

Abadi et al, "TensorFlow: A system for large scale machine learning," In Operating Systems Design and Implementations, Nov. 2016, 21 pages.

(Continued)

*Primary Examiner* — Khai N. Nguyen
(74) *Attorney, Agent, or Firm* — Honigman LLP; Brett A. Krueger; Grant Griffith

(57) ABSTRACT

Methods, systems, and apparatus, including computer programs encoded on computer storage media, for enhanced attention mechanisms. In some implementations, data indicating an input sequence is received. The data is processed using an encoder neural network to generate a sequence of encodings. A series of attention outputs is determined using one or more attender modules. Determining each attention output can include (i) selecting an encoding from the sequence of encodings and (ii) determining attention over a proper subset of the sequence of encodings, where the proper subset of encodings is determined based on a position of the selected encoding in the sequence of encodings. The selections of encodings are also monotonic through the sequence of encodings. An output sequence is generated by processing the attention outputs using a decoder neural network. An output is provided that indicates a language sequence determined from the output sequence.

20 Claims, 6 Drawing Sheets

(56) References Cited

U.S. PATENT DOCUMENTS

| | | | | |
|---|---|---|---|---|
| 10,546,066 | B2* | 1/2020 | Li | G06N 7/005 |
| 10,867,595 | B2* | 12/2020 | Sriram | G10L 15/183 |
| 2018/0060301 | A1* | 3/2018 | Li | G06N 3/08 |
| 2018/0082171 | A1* | 3/2018 | Merity | G06F 40/284 |
| 2018/0144208 | A1 | 5/2018 | Lu et al. | |
| 2018/0329884 | A1* | 11/2018 | Xiong | G06N 3/0445 |
| 2018/0330718 | A1* | 11/2018 | Hori | G06N 7/005 |
| 2018/0336880 | A1 | 11/2018 | Arik et al. | |
| 2018/0336884 | A1* | 11/2018 | Sriram | G10L 15/183 |
| 2019/0073353 | A1* | 3/2019 | Yu | G06F 40/211 |
| 2019/0122651 | A1 | 4/2019 | Arik et al. | |
| 2019/0205761 | A1 | 4/2019 | Wu et al. | |
| 2019/0189115 | A1 | 6/2019 | Hori et al. | |
| 2019/0332919 | A1* | 10/2019 | Weiss | G06N 3/0481 |
| 2019/0354808 | A1* | 11/2019 | Park | G10L 15/16 |
| 2020/0026760 | A1* | 1/2020 | Chiu | G06F 40/40 |

OTHER PUBLICATIONS

Aharoni et al, "Sequence to sequence transduction with hard monotonic attention," arXiv, Nov. 2016, 10 pages.

Bahdanau et al, "Neural machine translation by jointly learning to align and translate," arXiv, May 19, 2016.

Birch et al, "Predicting success in machine translation," ACM Digital Library, Oct. 2008, 10 pages.

Chan et al, "Listen, attend and spell: a neural network for large vocabulary conversational speech recognition," arXiv, Aug. 20, 2015, 16 pages.

Chiu et al, "Monotonic chunkwise attention," arXiv, Dec. 14, 2017, 13 pages.

Chiu et al, "Monotonic chunkwise attention," arXiv, Feb. 23, 2018, 16 pages.

Cho et al, "Learning phrase representations using RNN encoder-decoder for statistical machine translation," arXiv, Sep. 3, 2014, 15 pages.

Chorowski et al, "Attention-based models for speech recogition," NIPS, 2015, 9 pages.

Chorowski et al, "Towards better decoding and language model integration in sequence to sequence models," arXiv, Dec. 8, 2016, 6 pages.

Fan et al, "An online attention-based model for speech recognition," arXiv, Apr. 25, 2019, 5 pages.

Graves et al, "Connectionist temporal classification: labeling unsegmented sequence data with recurrent neural networks," ICML, Jun. 2006, 8 pages.

Graves et al, "Sequence transduction with recurrent neural network," arXiv, Nov. 14, 2012, 9 pages.

Guennebaud et al [online], "Eigen v3," available on or before Aug. 30, 2017, via Internet Archive: Wayback Machine URL <https://web.archive.org/web/20170830231531/http:/eigen.tuxfamily.org/index.php?title=Main_Page>, retrieved on Jul. 22, 2019, 14 pagesURL<http://eigen.tuxfamily.org/index.php?title=Main_Page>, 7 pages.

Hori et al, "Advances in joint CTC-attention based end-to-end speech recognition with a deep CNN ecoder and RNN-LM," arXiv, Jun. 8, 2017, 5 pages.

Ioffe et al, "Batch normalization: accelerating deep network training by reducing internal covariate shift," arXiv, Mar. 2, 2015, 11 pages.

Jaitly et al, "A neural transducer," arXiv, Aug. 4, 2016, 10 pages.

Kingma et al, "Adam: A method for stochastic optomization," arXiv, Jan. 30, 2017, arXiv, 15 pages.

Kong et al, "Segmental recurrent nueral networks," arXiv, Mar. 1, 2016, 10 pages.

Ladner et al, "Parallel prefix computation," Journal of ACM, 8 pages.

Lawson et al, "Learning hard alignments with variational inference," arXiv, Nov. 1, 2017, 5 pages.

Luo et al, "Learning online alignments with continuous rewards policy gradient," arXiv, Aug. 3, 2016, 9 pages.

Luong et al, "Effective approaches to attention-based neural machine translation," arXiv, Sep. 20, 2015, 11 pages.

Michael et al, "Evaluating sequence to sequence Models for Handwritten Text Recognition," arXiv, Jul. 15, 2019, 8 pages.

Nallapati et al, "Abstractive text summarization using sequence to sequence RNNs and beyond," arXiv, Aug. 26, 2016, 12 pages.

Paul et al, "The design for the wall street journal-based CSR corpus," ACL Web, 1992, 6 pages.

Prabhavalkar et al, "A comparison of sequence to sequence models for speech recognition," Semantic Scholar, Aug. 2017, 5 pages.

Raffel et al, "Feed-forward networks with attention can solve some long-term memory problems," arXiv, Jan. 8, 2016, 6 pages.

Raffel et al, "Online and linear-time attention by enforcing monotonic alignments," arXiv, Jun. 29, 2017, 19 pages.

See et al, "Get to the point: summarization with pointer-generator networks," arXiv, Apr. 25, 2017, 20 pages.

Sutskever et al, "Sequence to sequence learning with neural networks," NIPS, 2014, 9 pages.

Wang et al, "Lookahead convolution layer for unidirectional recurrent neural networks," In Workshop Extended Abstracts of the 4th International Conference on Learning Representations, 2016, 4 pages.

Wang et al, "Tacotron: towards end-to-end speech synthesis," arXiv, Apr. 6, 2017, 10 pages.

Xu et al, "Show, attend, and tell: neural image caption generation with visual attention," ICML, arXiv, Apr. 19, 2016 22 pages.

Yu et al, "Online segment to segment neural transduction," arXiv, Sep. 26, 2016, 10 pages.

Zaremba et al, "Reinforcement learning neural turing machines," arXiv, Jan. 12, 2016, 14 pages.

Zhang et al, "Very deep convolutional networks for end-to-end speech recognition," arXiv, Oct. 10, 2016, 5 pages.

\* cited by examiner

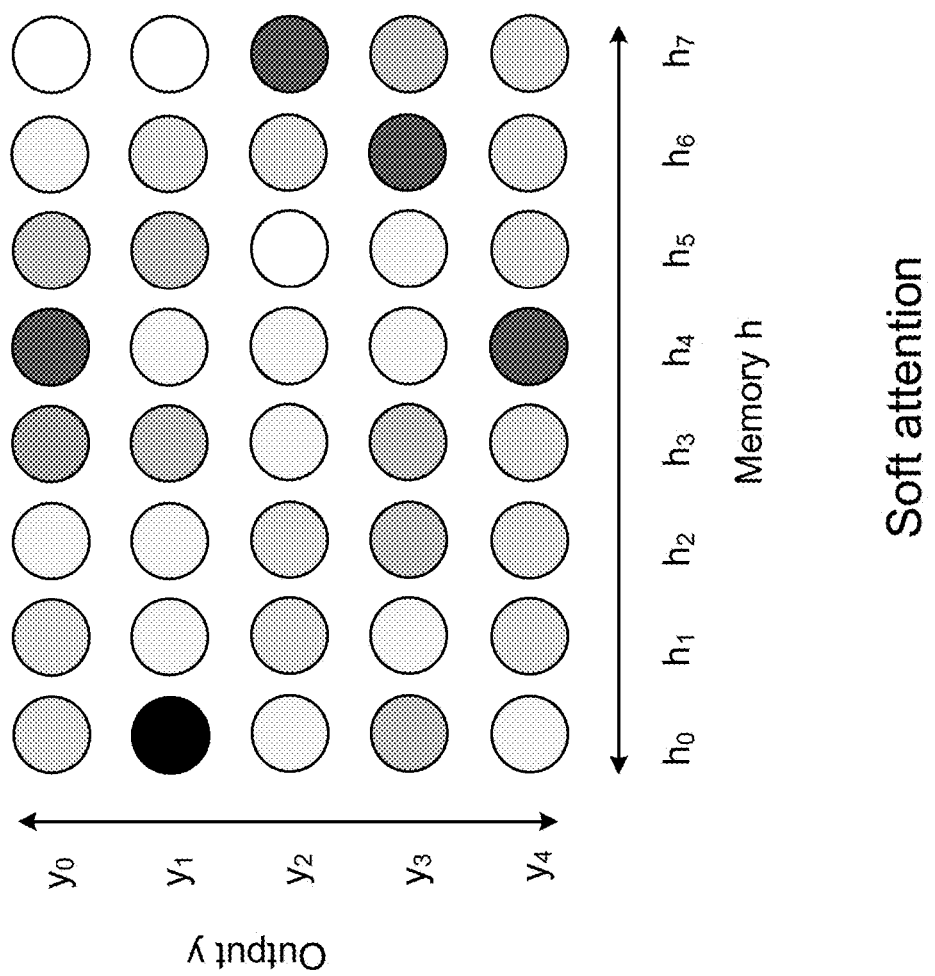

ENHANCED ATTENTION MECHANISMS

CROSS-REFERENCE TO RELATED APPLICATION

This application claims the benefit of U.S. Provisional Patent Application Ser. No. 62/702,049, filed on Jul. 23, 2018, the entire contents of which is incorporated by reference herein.

BACKGROUND

The present specification relates to attention mechanisms for sequence-to-sequence models. Sequence-to-sequence models with a soft attention mechanism have been applied to numerous sequence transduction problems. This type of model may be used to infer an alignment between an input sequence and an output sequence.

SUMMARY

Sequence-to-sequence models with soft attention have been successfully applied to a wide variety of problems, but their decoding process incurs a quadratic time and space cost and is inapplicable to real-time sequence transduction. To address these issues, a Monotonic Chunkwise Attention (MoChA) is presented, which adaptively splits the input sequence into small chunks over which soft attention is computed. It is shown that models utilizing MoChA can be trained efficiently with standard backpropagation while allowing online and linear-time decoding at test time. When applied to online speech recognition, state-of-the-art results were obtained and the performance of a model using an offline soft attention mechanism was matched. It is shown that the described implementations significantly improved performance compared to a baseline monotonic attention-based model.

In some implementations, a method is performed by one or more computers, for example, one or more computers of an automated language processing system. The method includes: receiving, by the one or more computers, data indicating an input sequence; processing, by the one or more computers, the data using an encoder neural network to generate a sequence of encodings; determining, by the one or more computers, a series of attention outputs with respect to the encodings using one or more attender modules, wherein determining each of the attention outputs includes (i) selecting an encoding from the sequence of encodings and (ii) determining attention over a proper subset of the sequence of encodings, wherein the proper subset of encodings is determined based on a position of the selected encoding in the sequence of encodings, and wherein the selections of encodings are monotonic through the sequence of encodings; generating, by the one or more computers, an output sequence by processing the attention outputs using a decoder neural network; and providing, by the one or more computers, an output that indicates a language sequence determined from the output sequence.

In some implementations, each of the proper subsets includes a same number of encodings.

In some implementations, selecting the encoding for each of the attention outputs includes constraining the selection of each selected encoding to be monotonic along the sequence of encodings with respect to an immediately previously selected encoding.

In some implementations, each of the attention outputs corresponds to a different one of multiple output steps, where, for each output step, the selected encoding is the encoding at (i) a same position in the sequence of encodings as a particular selected encoding for the immediately previous output step or (ii) a position in the sequence of encodings that is subsequent to the position in the sequence of encodings as a particular selected encoding for the immediately previous output step.

In some implementations, for each of the attention outputs, the proper subset is a window of encodings bounded by the selected encoding for the attention output.

In some implementations, the proper subsets are different positions of a sliding window that advances monotonically along the sequence of encodings for generating the series of attention outputs.

In some implementations, the sliding window has a fixed size for each of the attention outputs.

In some implementations, selecting the encoding from the sequence of encodings includes determining a hard monotonic attention output.

In some implementations, determining attention over each proper subset of the sequence of encodings includes: determining, based on the corresponding hard monotonic attention output, a soft attention output for a region of the encodings occurring before a location corresponding to the hard monotonic attention output.

In some implementations, the one or more attender modules are configured to determine, for each of the encodings, a soft attention output for a fixed, predetermined number of segments of the encodings.

In some implementations, the one or more attender modules are configured to compute hard attention outputs, such that (i) for each of the encodings, the decoder neural network attends to only a single encoded state of the encodings, and (ii) the alignment between the input sequence and output sequence is forced to be strictly monotonic.

In some implementations, the one or more attender modules are configured to compute soft attention for each of the encodings, over multiple different segments of the encodings selected with respect to adaptively set locations encodings.

In some implementations, the one or more computers are part of an automated speech recognition system; receiving the data indicating the input sequence includes receiving a sequence of feature vectors that indicate audio characteristics of an utterance; generating the output sequence includes generating a sequence of distributions over a set of symbols that represents at least one of linguistic states, phones, characters, word pieces, or words; and providing the output that indicates the language sequence includes providing, an output that indicates a transcription for the utterance.

In some implementations, the automated speech recognizer performs online recognition of the utterance, such that an initial portion of the utterance is recognized and indicated while the speaker is speaking a later portion of the utterance.

In some implementations, the encoder neural network includes at least one convolutional layer, at least one convolutional long short-term memory (LSTM) layer, and at least one unidirectional LSTM layer; and the decoder includes a unidirectional LSTM layer.

In some implementations, the one or more computers are part of an automated document summarization system; receiving the data indicating the input sequence includes receiving a sequence of inputs indicating text of at least a portion of a first text; generating the output sequence includes generating a sequence of distributions over a predetermined word vocabulary; and providing the output that indicates the language sequence includes providing, an output that indicates generated natural language text representing an automatically summarized version of at least a portion of the first text.

In some implementations, the encoder neural network includes a bidirectional LSTM layer; and the decoder neural network includes a unidirectional LSTM layer and a softmax layer that outputs a distribution over the predetermined word vocabulary.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 1A-1C are diagrams of schematics of attention mechanisms, according to an implementation of the present disclosure.

Like reference numbers and designations in the various drawings indicate like elements.

DETAILED DESCRIPTION

The present disclosure introduces a novel attention mechanism, which retains the online and linear-time advantages of hard monotonic attention while allowing for the flexibility and accuracy improvements of soft attention alignments.

In general, a sequence-to-sequence model can process an input sequence with an encoder recurrent neural network (RNN) to produce a sequence of hidden states, referred to as a memory. A decoder RNN then autoregressively produces the output sequence. At each output time step, the decoder is directly conditioned by an attention mechanism, which allows the decoder to refer back to entries in the encoder's hidden state sequence.

Figure 1B:
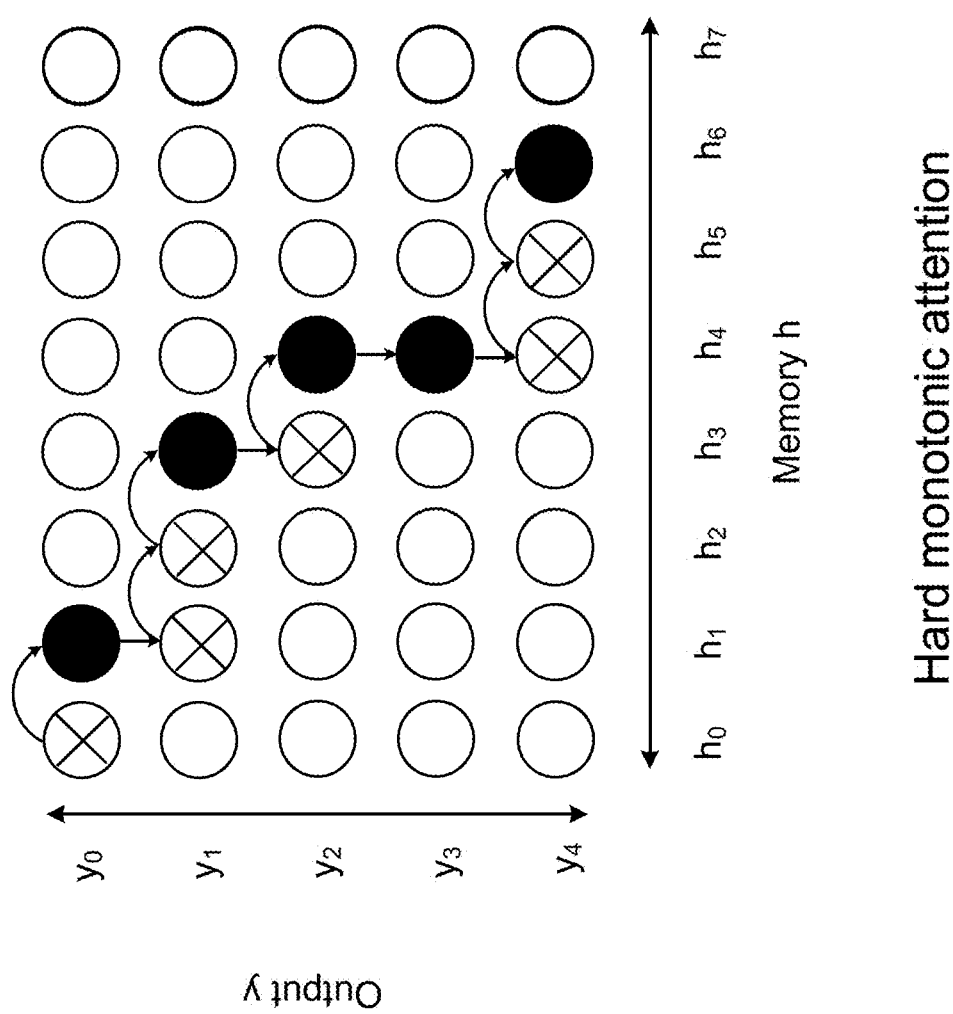
Figure 1C:
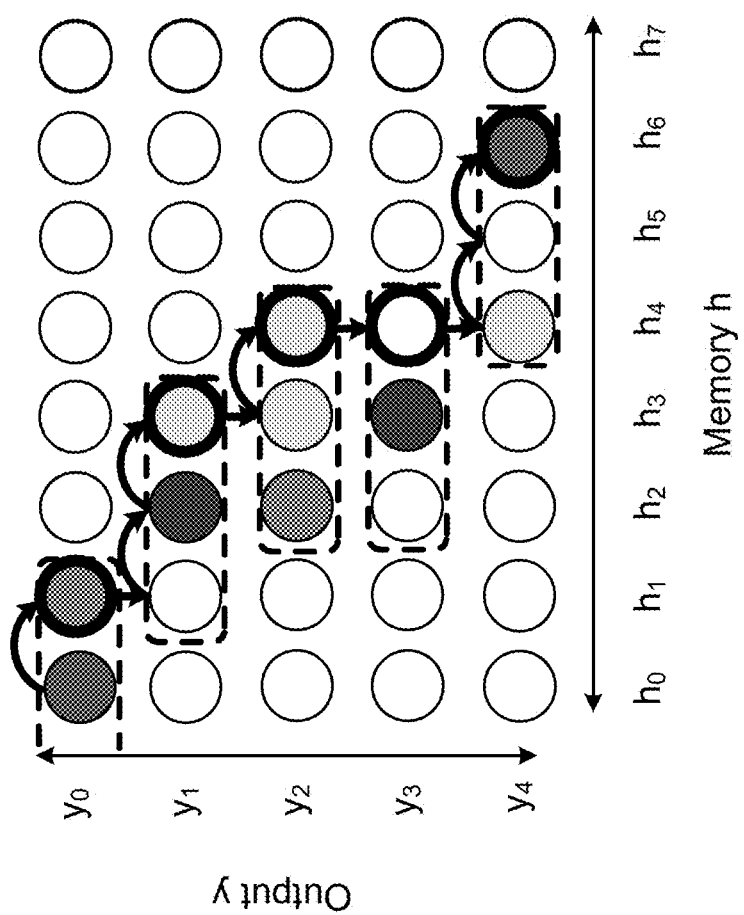
Figure 2A:
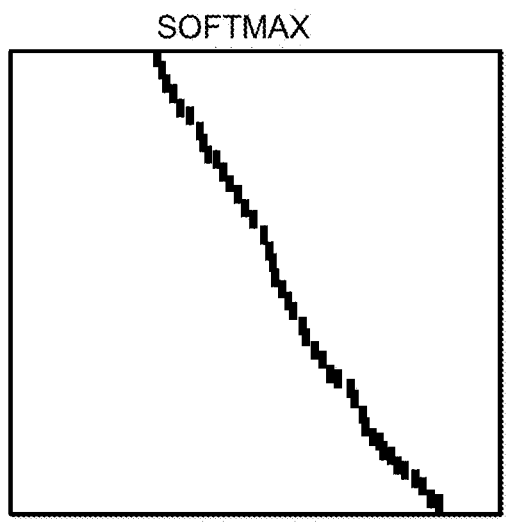
FIGS. 2A-2D are attention alignments plots and speech utterance feature sequence for the speech recognition task, according to an implementation of the present disclosure.
Figure 2B:
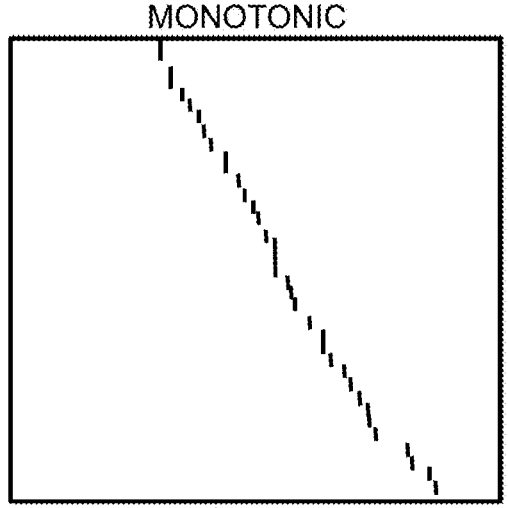
Figure 2C:
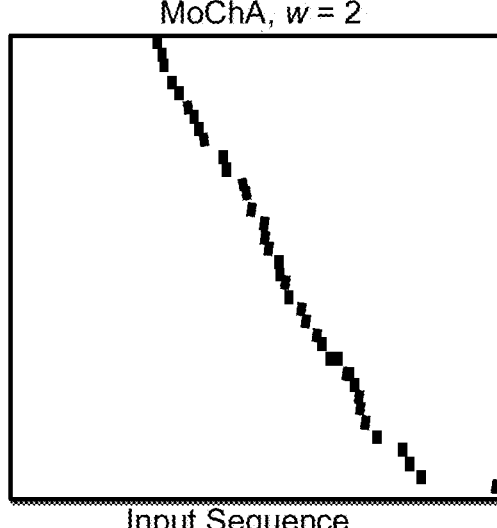
Figure 2D:
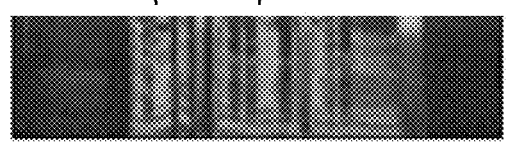
Figure 3:
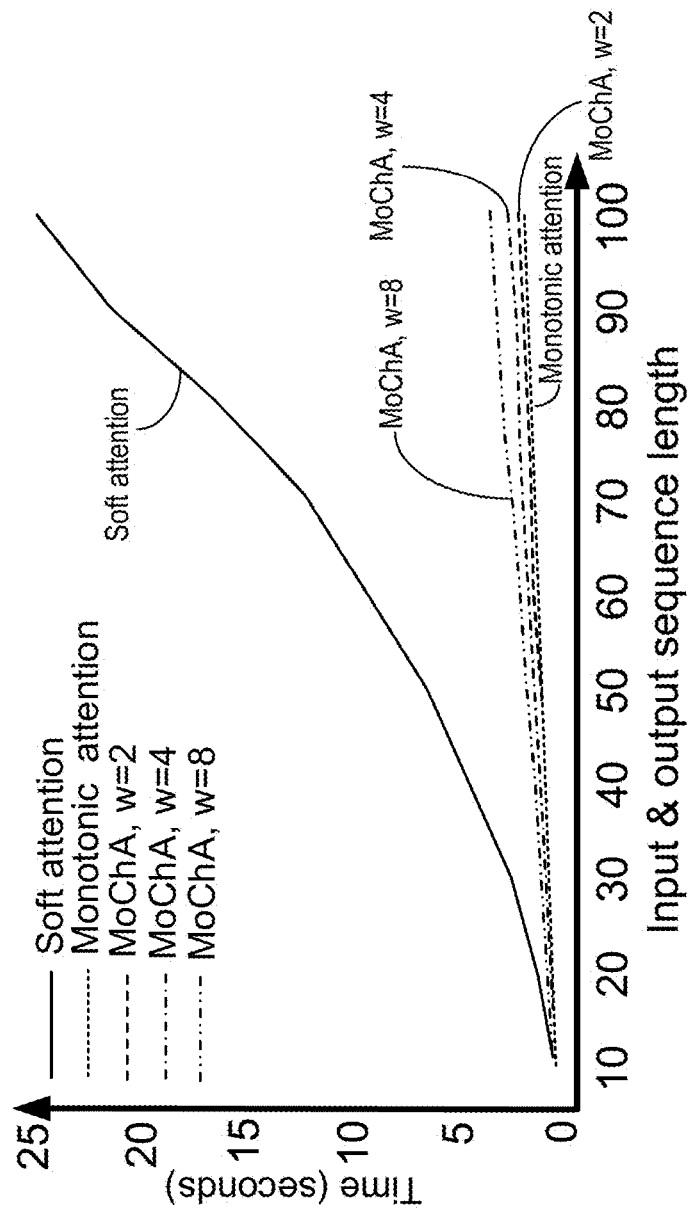
FIG. 3 is a chart of running time requirements, illustrating computational complexity of different modelling approaches.

FIGS. 1A-1C are diagrams of schematics of several attention mechanisms. In FIGS. 1A-1C, each node represents the possibility of the model attending to a given memory entry (horizontal axis) at a given output step (vertical axis). The memory entries are labeled $h_0$ to $h_7$ in order from left to right, and the outputs for the different steps are labeled $y_0$ to $y_4$. Each row of nodes represents the same set of memory entries $\{h_0, \ldots, h_7\}$. The shading of the different rows represents the different attention computed for this set of memory entries. Thus, the top row represents the attention used on the set of memory entries to calculate the output $y_0$, the row below represents the attention used on the same set of memory entries to calculate the output $y_1$, and so on.

FIG. 1A illustrates soft attention, in which the model assigns a probability (represented by the shade of gray of each node, with darker shades representing higher probabilities) to each memory entry at each output step. The context vector is computed as the weighted average of the memory, weighted by these probabilities. Thus, a darker shading represents a higher weighting of the content of the memory entry. In this example, for each output $\{y_0, \ldots, y_4\}$, attention is computed over the entire set of memory entries $\{h_0, \ldots, h_7\}$.

FIG. 1B shows an example of monotonic attention. At test time or inference, monotonic attention inspects memory entries from left-to-right, choosing whether to move on to the next memory entry (where nodes with X show memory entries inspected and skipped) or stop and attend (shown as black nodes). The context vector is hard-assigned to the memory entry that was attended to. In other words, the single memory entry where attention is placed can be used as the context vector. At the next output step, the monotonic attention process starts inspecting memory entries from the position selected for the previous output time step. For example, after selecting memory entry $h_1$ to attend to for generating output $y_0$, the monotonic attention mechanism begins with inspection of the same memory entry $h_1$ when determining attention for generating output $y_1$. Thus, the attention mechanism progresses through the memory entries in the same direction each time, e.g., from left to right in the example, until reaching a single memory entry to attend to. As illustrated, for the second output step, the attention mechanism inspects but moves beyond memory entries $h_1$ and $h_2$ to attend to memory entry $h_3$ for providing the context vector used to generate output $y_1$. The monotonic nature of the attention mechanism can be seen in the way the index value for the memory entries attended to does not decrease (e.g., stays the same or increases) from each output step to the next (e.g., $h_1$ is selected for computing $y_0$, $h_3$ is selected for computing $y_1$, $h_4$ is selected for computing $y_2$, and so on).

FIG. 1C shows a technique called "monotonic chunkwise attention" (MoChA), which enables performance of soft attention over small chunks of the memory preceding where a hard monotonic attention mechanism has chosen to attend. MoChA utilizes a hard monotonic attention mechanism to choose the endpoint (shown as nodes with bold borders) of the chunk over which it attends. This endpoint is the right-most node in each chunk. The chunk boundaries (here, with a window size of 3) are shown as dashed lines. For each time step, the model performs soft attention (with attention weighting shown as the different shades of gray) over the chunk of the memory set by the window position for the time step, and computes the context vector as the chunk's weighted average. Thus the chunk the memory, h, that is used to determine the context vector for a given time step is set by the window size, which is fixed in this example, and the endpoint position, which is selected according to monotonic constraints.

As an example, for computing output $y_0$, the attention mechanism computes hard attention to select memory entry $h_1$. This sets the right-most boundary of the subset of memory entries that will be used for soft attention calculation. The sliding window of size three thus includes the selected memory entry $h_1$ at the right-most boundary extends to include up to two additional memory entries that occur earlier in the sequence of memory entries. In this case, there is only one prior memory entry, $h_0$, so the window includes only memory entries $h_0$ and $h_1$. For computing output $y_1$, the attention mechanism proceeds monotonically through the memory to select a memory entry as a boundary for the sliding window. The monotonic constraint requires the mechanism to select either the memory entry $h_1$ that was selected for the previous output step or the memory entry for a subsequent output step. In the example, attention mechanism begins consideration at the previous selected memory entry, $h_1$, then considers the next memory entry, $h_2$, then considers the next memory entry, $h_3$, and selects memory entry $h_3$ as the hard attention result. From this selection, the sliding window is set with memory entry $h_3$ as the right-most memory entry included in the sliding window, and the window size of three encompasses the memory entries $h_2$ and $h_1$ also. The attention mechanism computes soft attention over the set of memory entries $h_3$, $h_2$, and $h_1$ and the attention output is used to generate output $y_1$. The process continues in a similar manner with the hard attention selection for computing attention for generating output $y_2$ beginning with consideration of memory entry $h_3$, and so on.

With MoChA, the attention mechanism can progress through the memory in single direction, as with hard attention. However, a memory entry is selected not as a single memory entry to use, but as the boundary of a region comprising multiple memory entries that will be attended to. This results in an attention mechanism that uses a sliding window over the memory entries. The set of memory entries that the sliding window encompasses can vary from one time step to another, but moves only monotonically, e.g., in a single direction, through the memory. As a result, each attention determination can be based on a subset of memory entries (e.g., encodings or encoded states), where a boundary of the subset is set by the memory entry selected using hard attention.

In some implementations, the sliding window has a fixed size or maximum size, so that the same number of values or memory entries are included in each subset. In the example of FIG. 1C, the window size is three memory entries, as shown by the dashed boxes drawn over the memory states. This means that up to three memory entries are selected in the subset for determining each attention output, e.g., the memory entry at the far right of the subset that was selected as a result of hard attention and up to two immediately previous memory entries in the memory. For output step 0, for the computation of output $y_0$, there is only one entry before the selected entry, $h_2$, that sets the right-most boundary for the subset, and so the subset includes only two memory entries.

In the examples of FIGS. 1A-1C, the memory entries $h_0$-$h_7$ can represent encodings for different input steps. The input steps can represent a progression along a dimension, such as (i) steps in time (e.g., through audio or video data), (ii) steps through the content of a document or data set (e.g., positions along a document from beginning to end), (iii) steps along a spatial dimension, (iv) steps along an index, and so on. For example, the memory entries $h_0$-$h_7$ can represent a series of encodings that an encoder neural network generated based on processing a series of acoustic feature vectors representing successive frames or segments of audio data to be analyzed, e.g., for the purpose of keyword spotting or speech recognition. In this scenario, each memory entry h0-h7 may represent a different output of an encoder, with each encoding being produced in response to a different frame of input data to the encoder. Memory entry $h_0$ can represent the encoding for frame $f_0$, memory entry $h_1$ can represent the encoding for frame $f_1$, and so on. As another example, the memory entries $h_0$-$h_7$ can indicate encodings generated for different successive sections of a document being analyzed, e.g., for document summarization or machine translation. As another example, the memory entries $h_0$-$h_7$ can represent encodings generated for different portions of an image being analyzed, e.g., for object recognition or other image processing. As another example, the memory entries $h_0$-$h_7$ can represent encodings for phones or text elements to be used in text-to-speech synthesis.

The outputs $y_0$-$y_4$ represent outputs for different output steps. The output steps are not required to correspond to the input steps. In other words, there may be multiple input steps for each output step, and vice versa. Note that FIGS. 1A-1C do not represent the actual content of the output $y_0$-$y_4$, but instead illustrate the principles used to create the attention outputs that would be used to generate the respective outputs $y_0$-$y_4$. The content of the outputs y0-y4 can represent any appropriate sequence of outputs for a sequence-to-sequence model. As an example, for speech recognition, the outputs y0-y4 may represent a series of predictions of phone, grapheme, word piece, or words. The predictions may be in the form of a probability distribution over a predetermined set of output targets. As another example, for keyword spotting, the outputs may represent likelihoods whether a predetermined keyword has occurred given the values evaluated in the memory. As another example, for document summarization or machine translation, the outputs may represent indications of a grapheme, word piece, or word to be included in a document summary or translation. As another example, for text-to-speech synthesis, the outputs may represent predictions of sounds, speech units, prosody, acoustic parameters, or other aspects of synthesized speech.

The model includes a training procedure, which allows it to be straightforwardly applied to existing sequence-to-sequence models and trained with standard backpropagation. It is experimentally shown that MoChA effectively closes the gap between monotonic and soft attention on online speech recognition and provides a 20% relative improvement over monotonic attention on document summarization (a task which does not exhibit monotonic alignments). The advantages incur only a modest increase in the number of parameters and computational cost.

Because MoChA can be considered a generalization of monotonic attention, the approach is re-derived and some of its shortcomings are pointed out. It is shown how soft attention over chunks can be straightforwardly added to hard monotonic attention, giving us the MoChA attention mechanism. It is also shown how MoChA can be trained efficiently with respect to the mechanism's expected output, which allows the use of standard backpropagation.

A sequence-to-sequence model is one which transduces an input sequence $x'=\{x_1, \ldots, x_T\}$ to an output sequence (potentially of a different modality) $y'=\{y_1, \ldots, y_U\}$. Typically, the input sequence is first converted to a sequence of hidden states $h'=\{h_1, \ldots, h_T\}$ by an encoder recurrent neural network (RNN):

$$h_j = \text{EncoderRNN}(x_j, h_j-1) \quad (1)$$

A decoder RNN then updates its hidden state autoregressively and an output layer (typically using a softmax nonlinearity) produces the output sequence:

$$s_i = \text{DecoderRNN}(y_{i-1}, s_{i-1}, c_i) \quad (2)$$

$$y_i = \text{Output}(s_i, c_i) \quad (3)$$

The parameter $s_i$ represents the decoder's state and $c_i$ represents a "context" vector, which is computed as a function of the encoder hidden state sequence h. In this example, and in at least some implementations, the context vector $c_i$ is the sole conduit through which the decoder has access to information about the input sequence.

In the originally proposed sequence-to-sequence framework the context vector is simply set to the final encoder hidden state, i.e., $c_i = h_T$. It was subsequently found that the approach exhibits degraded performance when transducing long sequences. Instead, it has become standard to use an attention mechanism, which treats the hidden state sequence as a (soft-)addressable memory whose entries are used to compute the context vector $c_i$. Three such approaches for computing $c_i$ are discussed; otherwise, the sequence-to-sequence framework remains unchanged.

In the most commonly used attention mechanism, at each output time step i, the approach proceeds as follows: First, an unnormalized scalar "energy" value $e_{i,j}$ is produced for each memory entry:

$$e_{i,j} = \text{Energy}(h_j, s_{i-1})$$

A common choice for Energy(•) is:

$$\text{Energy}(h_j, s_{i-1}) := v^T \tanh(W_h h_j + W_s s_{i-1} + b)$$

parameters $W_h \in R^{d \times dim(h_j)}$, $W_s \in R^{d \times dim(s_{i-1})}$, $b \in R^d$ and $v \in R^d$ are learnable parameters and d is the hidden dimensionality of the energy function. Second, these energy scalars are normalized across the memory using the softmax function to produce weighting values $\alpha_{i,j}$:

$$\alpha_{i,j} = \frac{\exp(e_{i,j})}{\sum_{k=1}^{T} \exp(e_{i,k})} = \text{softmax}(e_{i,:})_j$$

The context vector is computed as a simple weighted average of h, weighted by $\alpha_i$:

$$c_i = \sum_{j=1}^{T} \alpha_{i,j} h_j$$

The soft attention mechanism is illustrated in FIG. 1A. Note that in order to compute $c_i$ for any output time step i, all of the encoder hidden states $h_j$ for $j \in \{1, \ldots, T\}$ are calculated. The soft attention mechanism is not applicable to online/real-time sequence transduction problems, because it needs to have observed the entire input sequence before producing any output. Furthermore, producing each context vector $c_i$ involves computing T energy scalar terms and weighting values. While the operations can typically be parallelized, the soft attention mechanism is associated with increased O(TU) cost in time and space.

To address the aforementioned issues with soft attention, a hard monotonic attention mechanism was proposed and described as follows: At output time step i, the attention mechanism begins inspecting memory entries starting at the memory index it attended to at the previous output time step, referred to as $t_{i-1}$. It then computes an unnormalized energy scalar $e_{i,j}$ for $j = t_{i-1}, t_{i-1}+1, \ldots$ and passes these energy values into a logistic sigmoid function σ(•) to produce "selection probabilities" $p_{i,j}$. Then, a discrete attend/don't attend decision $z_{i,j}$ is sampled from a Bernoulli random variable parameterized by $p_{i,j}$. The unnormalized energy scalar is:

$$e_{i,j} = \text{MonotonicEnergy}(s_{i-1}, h_j)$$

$$p_{i,j} = \sigma(e_{i,j})$$

$$z_{i,j} \sim \text{Bernoulli}(p_{i,j})$$

As soon as $z_{i,j}=1$ for some j, the model stops and sets $t_i=j$ and $c_i=h_{t_i}$. The process is visualized in FIG. 1B. Note that because the attention mechanism only makes a single pass over the memory, it has a O(max(T, U)) (linear) cost. Further, in order to attend to memory entry $h_j$, the encoder RNN only needs to have processed input sequence entries $x_1, \ldots, x_j$, which allows it to be used for online sequence transduction. Finally, note that if $p_{i,j} \in \{0, 1\}$ (a condition which is encouraged, as discussed below) then the greedy assignment of $c_i = h_{t_i}$ is equivalent to marginalizing over possible alignment paths.

Because the attention process involves sampling and hard assignment, models utilizing hard monotonic attention cannot be trained with backpropagation. As a remedy, a training with respect to the expected value of $c_i$ by computing the probability distribution over the memory induced by the attention process was proposed. The distribution has the following form:

$$\alpha_{i,j} = p_{i,j}\left((1 - p_{i,j-1})\frac{\alpha_{i,j-1}}{p_{i,j-1}} + \alpha_{i-1,j}\right)$$

The context vector ci is then computed as a weighted sum of the memory as in equation (7). Equation (11) can be explained by observing that $(1-p_{i,j-1})\alpha_{i,j-1}/p_{i,j-1}$ is the probability of attending to memory entry j-1 at the current output time step ($\alpha_{i,j-1}$) corrected for the fact that the model did not attend to memory entry j (by multiplying by $(1-p_{i,j-1})$ and dividing by $p_{i,j-1}$). The addition of $\alpha_{i-1,j}$ represents the additional possibility that the model attended to entry j at the previous output time step, and finally multiplying it all by pi,j reflects the probability that the model selected memory item j at the current output time step i. The recurrence relation is not parallelizable across memory indices j (unlike, say, softmax), but fortunately substituting $q_{i,j}=\alpha_{i,j}/p_{i,j}$ produces the first-order linear difference equation $q_{i,j}=(1-p_{i,j-1})q_{i,j-1}+\alpha_{i-1,j}$ which has the following solution:

$$q_{i,:} = \text{cumprod}(1 - p_{i,:}) \text{cumsum}\left(\frac{\alpha_{i-1,:}}{\text{cumprod}(1 - p_{i,:})}\right)$$

The parameter $\text{cumprod}(x) = [1, x_1, x_1 x_2, \ldots \Pi_i^{|x|-1} x_i]$ and $\text{cumsum}(x) = [x_1, x_1+x_2, \ldots ; {}^{|x|} x_i]$. Because the cumulative sum and product can be computed in parallel, models can still be trained efficiently with the described approach.

Note that training is no longer online or linear-time, but the proposed solution is to use the "soft" monotonic attention for training and use the hard monotonic attention process at test time. To encourage discreteness, the common approach of adding zero-mean, unit-variance Gaussian noise to the logistic sigmoid function's activations was used, which causes the model to learn to produce effectively binary $p_{i,j}$. If $p_{i,j}$ are binary, $z_{i,j} = \mathbb{1}(p_{i,j}>0.5)$, in practice sampling is eschewed at test-time in favor of simple thresholding. Separately, it was observed that switching from the softmax nonlinearity to the logistic sigmoid resulted in optimization issues due to saturating and sensitivity to offset. To mitigate this, a slightly modified energy function was used:

$$\text{MonotonicEnergy}(s_{i-1}, h_j) = g\frac{v^T}{\|v\|}\tanh(W_s s_{i-1} + W_h h_j + b) + r$$

Parameters g, r are learnable scalars and v, $W_s$, $W_h$, b are as in equation (5).

While hard monotonic attention provides online and linear-time decoding, it nevertheless imposes two significant constraints on the model. First constraint is that the decoder can only attend to a single entry in memory at each output time step, and second constraint is that the input-output alignment must be strictly monotonic. The constraints are in contrast to standard soft attention, which allows a potentially arbitrary and smooth input-output alignment. Experimentally, it was shown that performance de-grades somewhat on all tested tasks. A hypothesis is that the degradation stems from the aforementioned constraints imposed by hard monotonic attention.

1C. Note that MoChA allows for nonmonotonic alignments; specifically, it allows for reordering of the memory entries $h_v, \ldots, h_{t_i}$. Including soft attention over chunks only increases the runtime complexity by the constant factor w, and decoding can still proceed in an online fashion. Furthermore, using MoChA only incurs a modest increase in the total number of parameters (corresponding to adding the second attention energy function ChunkEnergy(•)). For

---

Algorithm 1 MoChA decoding process (test time). During training, lines 4-19 are replaced with eqs. (20) to (26) and $y_{i-1}$ is replaced with the ground-truth output at timestep i − 1.

---

1:   Input: memory h of length T, chunk size w
2:   State: $s_0 = \vec{0}$, $t_0 = 1$, $i = 1$, $y_0$ = StartOfSequence
3:   while $y_{i-1} \neq$ EndOfSequence do // Produce output tokens until end-of-sequence token is produced
4:     for $j = t_{i-1}$ to T do // Start inspecting memory entries $h_j$ left-to-right from where we left off
5:       $e_{i,j}$ = MonotonicEnergy($s_{i-1}$, $h_j$) // Compute attention energy for $h_j$
6:       $p_{i,j} = \sigma(e_{i,j})$ // Compute probability of choosing $h_j$
7:       if $p_{i,j} \geq 0.5$ then // If $p_{i,j}$ is larger than 0.5, we stop scanning the memory
8:         $v = j - w + 1$ // Set chunk start location
9:         for $k = v$ to $j$ do // Compute chunkwise softmax energies over a size-w chunk before j
10:           $u_{i,k}$ = ChunkEnergy($s_{i-1}$, $h_k$)
11:         end for 12:
$$c_i = \sum_{k=v}^{j} \frac{\exp(u_{i,k})}{\sum_{l=v}^{j} \exp(u_{i,l})} h_k \quad \text{// Compute softmax-weighted average over the chunk}$$

13:         $t_i = j$ // Remember where we left off for the next output timestep
14:         break // Stop scanning the memory
15:       end if
16:     end for
17:     if $p_{i,j} < 0.5$, $\forall j \in \{t_{i-1}, t_{i-1} + 1, \ldots, T\}$ then
18:       $c_i = \vec{0}$ // If we scanned the entire memory without stopping, set $c_i$ to a vector of zeros
19:     end if
20:     $s_i$ = DecoderRNN($s_{i-1}$, $y_{i-1}$, $c_i$) // Update output RNN state based on the new context vector
21:     $y_i$ = Output($s_i$, $c_i$) // Output a new symbol using the softmax output layer
22:     $i = i + 1$
23:   end while

---

To remedy these issues, a novel attention mechanism is proposed, which is called MoChA, for Monotonic Chunkwise Attention. The core of the idea is to allow the attention mechanism to perform soft attention over small "chunks" of memory preceding where a hard monotonic attention mechanism decides to stop. Some degree of softness is facilitated in the input-output alignment, while retaining the online decoding and linear-time complexity advantages. At test time, the hard monotonic attention process is followed in order to determine $t_i$ (the location where the hard monotonic attention mechanism decides to stop scanning the memory at output time step i). However, instead of setting $c_i = h_{t_i}$, we allow the model to perform soft attention over the length-w window of memory entries preceding and including $t_i$:

$$v = t_i - w + 1 \tag{14}$$

$$u_{i,k} = \text{ChunkEnergy}(s_{i-1}, h_k), k \in \{v, v+1, \ldots, t_i\} \tag{15}$$

$$c_i = \sum_{k=v}^{t_i} \frac{\exp(u_{i,k})}{\sum_{l=v}^{t_i} \exp(u_{i,l})} h_k \tag{16}$$

ChunkEnergy(•) is an energy function analogous to equation (5), which is distinct from the MonotonicEnergy(•) function. MoChA's attention process is visualized in FIG.

example, in the speech recognition experiments, the total number of model parameters only increased by about 1%. The setting w=1 recovers hard monotonic attention.

During training, the model uses the expected value of $c_i$ based on MoChA's induced probability distribution (denoted as $\beta_{i,j}$). This can be computed as:

$$\beta_{i,j} = \sum_{k=j}^{j+w-1} \left( a_{i,k} \exp(u_{i,j}) / \sum_{l=k-w+1}^{k} \exp(u_{i,l}) \right) \tag{17}$$

The sum over k reflects the possible positions at which the monotonic attention could have stopped scanning the memory in order to contribute probability to $\beta_{i,j}$ and the term inside the summation represents the softmax probability distribution over the chunk, scaled by the monotonic attention probability $\alpha_{i,k}$. Computing each $\beta_{i,j}$ in this fashion is expensive due to the nested summation. Fortunately, there is an efficient way to compute $\beta_{i,j}$ for $j \in \{1, \ldots, T\}$ in parallel: First, for a sequence $x = \{x_1, \ldots, x_T\}$:

$$\text{MovingSum}(x, b, f)_n := \sum_{m=n-1(b-1)}^{n+f-1} x_m \tag{18}$$

This function can be computed efficiently, for example, by convolving x with a length-(f+b−1) sequence of 1s and truncating appropriately. The parameter $\beta_j$, can be computed as:

$$\beta_{i,:} = \exp(u_{i,:}) MovingSum\left(\frac{\alpha_{i,:}}{MovingSum(\exp(u_{i,:}), w, 1)}, 1, w\right) \quad (19)$$

The following algorithm for computing $c_i$ during training is produced:

$$e_{i,j} = MonotonicEnergy(s_{i-1}, h_j) \quad (20)$$

$$\epsilon \sim \mathcal{N}(0, 1) \quad (21)$$

$$p_{i,j} = \sigma(e_{i,j} + \epsilon) \quad (22)$$

$$\alpha_{i,:} = p_{i,:} cumprod(1 - p_{i,:}) cumsum\left(\frac{\alpha_{i-1,:}}{cumprod(1 - p_{i,:})}\right) \quad (23)$$

$$u_{i,j} = ChunkEnergy(s_{i-1}, h_j) \quad (24)$$

$$\beta_{i,:} = \exp(u_{i,:}) MovingSum\left(\frac{\alpha_{i,:}}{MovingSum(\exp(u_{i,:}), w, 1)}, 1, w\right) \quad (25)$$

$$c_i = \sum_{j=1}^{T} \beta_{i,j} h_j \quad (26)$$

Equations (20) to (23) reflect the (unchanged) computation of the monotonic attention probability distribution, equations (24) and (25) compute MoChA's probability distribution, and finally equation (26) computes the expected value of the context vector $c_i$. In summary, a novel attention mechanism was developed, which allows computing soft attention over small chunks of the memory, whose locations are set adaptively. The mechanism has an efficient training-time algorithm and enjoys online and linear-time decoding at test time.

In general, using the MoChA technique, the encoder processes the input sequence to produce a sequence of encoder outputs over which attention is performed. The attention module produces output for each time step, e.g., for each new item in the input sequence or each new output of the encoder. To provide soft attention, a hard attention determination is used by the attention module at each timestep, as the endpoint for the soft attention window. The hard attention value used may not change at each timestep however, depending on the results of the hard attention calculation. During evaluation when hard attention is being used, the model doesn't produce a hard attention value for each of the encoder states. Rather, the decoder starts from where it left off at the previous output timestep, and continues until it assigns an attention weight of 1 to some entry of the input.

To test MoChA, it was applied to two exemplary sequence transduction tasks: online speech recognition and document summarization. Speech recognition is a promising setting for MoChA because it induces a naturally monotonic input-output alignment, and because online decoding is often required in the real world. Document summarization, on the other hand, does not exhibit a monotonic alignment, and it is included as a way of testing the limitations of the model. In all experiments, a strong baseline sequence-to-sequence model was used with standard soft attention and changed only the attention mechanism; all hyperparameters, model structure, training approach, etc. were kept exactly the same. The change enabled isolation of the effective difference in performance caused by switching to MoChA. The results can include an artificially low estimate of the best-case performance of MoChA, due to the fact that it may benefit from a somewhat different hyperparameter setting.

For MoChA equation (13) was used for both the MonotonicEnergy and the ChunkEnergy functions. Following, $g=1/\sqrt{d}$ (d being the attention energy function hidden dimension) and tuned initial values for r based on validation set performance, using r=−4 for MoChA on speech recognition, r=0 for MoChA on summarization, and r=−1 for the monotonic attention baseline on summarization. The chunk was tuned to size w. For speech recognition, it was found that all of w ∈ {2, 3, 4, 6, 8} performed comparably and the smallest value of w=2 can be used. For summarization, it was found that w=8 works best. It was demonstrated empirically that even these small window sizes give a significant boost over hard monotonic attention (w=1) while incurring only a minor computational penalty. In all experiments, metrics were reported on the test set at the training step of best performance on a validation set.

For online speech recognition, MoChA in its natural setting, i.e. a domain where roughly monotonic alignments are expected. The goal in this task is to produce the sequence of words spoken in a recorded speech utterance. In natural setting, RNN-based models can be unidirectional in order to satisfy the online requirement. The network ingests the spoken utterance as a mel-filterbank spectrogram, which is passed to an encoder consisting of convolution layers, convolutional LSTM layers, and unidirectional LSTM layers. The decoder is a single unidirectional LSTM, which attends to the encoder state sequence via either MoChA or a standard soft attention mechanism. The decoder produces a sequence of distributions over character and word-delimiter tokens. Performance is measured in terms of word error rate (WER) after segmenting characters output by the model into words based on the produced word delimiter tokens. None of the models reported integrated a separate language model.

The results of the experiments are shown in Table 1. MoChA was able to beat the state-of-the-art by a large margin (20% relative). Because the performance of MoChA and the soft attention baseline was so close, 8 repeat trials were performed for both attention mechanisms and report the best, average, and standard deviation of word error rates across these trials were derived. MoChA-based models have slightly higher variance across trials, which resulted in it having a lower best WER but a slightly higher mean WER compared to soft attention (though the difference in means was not statistically significant for N=8 under an unpaired Student's t-test). The online attention mechanism matches the performance of standard (offline) soft attention. Attention alignments for an example from the WSJ validation set are illustrated in FIGS. 2A-2D. As expected, the alignment looks roughly the same for all attention mechanisms. MoChA can provide the opportunity to produce a soft attention distribution over each length-2 chunk.

Since it was empirically found that the small value of w=2 can be sufficient to realize gains, a few additional experiments were conducted to confirm that they can be attributed to MoChA. First, the use of a second independent attention energy function. ChunkEnergy(•) incurs a modest increase in parameter count—about 1% in the speech recognition model. To ensure the improved performance was not due to this parameter increase, the monotonic attention baseline was retrained with an energy function with a doubled hidden dimensionality (which produces a comparable increase in the number of parameters in a natural way).

TABLE 1

Word error rate on the Wall Street Journal test set.
The results reflect the statistics of 8 trials.

| Attention Mechanism | Best WER | Average WER |
|---|---|---|
| Soft Attention (offline) | 14.2% | 14.6 ± 0.3% |
| MoChA, w = 2 | 13.9% | 15.0 ± 0.6% |

TABLE 2

ROUGE F-scores for document summarization on the CNN/Daily Mail dataset.

| Mechanism | R-1 | R-2 |
|---|---|---|
| Soft Attention (offline) | 39.11 | 15.76 |
| Hard Monotonic Attention | 31.14 | 11.16 |
| MoChA, w = 8 | 35.46 | 13.55 |

Across eight trials, the difference in performance (a decrease of 0.3% WER) was not significant compared to the baseline and was dwarfed by the gains achieved by MoChA. The w=2 MoChA model was tested with half the attention energy hidden dimensionality (which similarly reconciles the parameter difference) and found it did not significantly undercut the gains, increasing the WER by only 0.2% (not significant over eight trials). Separately, one possible benefit of MoChA is that the attention mechanism can access a larger window of the input when producing the con-text vectors. An alternative approach towards the end would be to increase the temporal receptive field of the convolutional front-end, the monotonic attention baseline was retrained with the change. Again, the difference in performance (an increase of 0.3% WER) was not significant over eight trials. The additional experiments reinforce the advantages of using MoChA for online speech recognition.

The limits of MoChA are tested in a task without a monotonic input/output alignment. The problem was primarily studied because it has the potential to be challenging, online and linear-time attention could also be beneficial in real-world scenarios where very long bodies of text need to be summarized as they are being created (e.g. producing a summary of a speech as it is being given).

The goal of the task is to produce a sequence of "highlight" sentences from a news article. As a baseline model, the "pointer-generator" network (without the coverage penalty) was chosen. Input words are converted to a learned embedding and passed into the model's encoder, consisting of a single bidirectional LSTM layer. The decoder is a unidirectional LSTM with an attention mechanism whose state is passed to a softmax layer which produces a sequence of distributions over the vocabulary. The model is augmented with a copy mechanism, which interpolates linearly between using the softmax output layer's word distribution, or a distribution of word IDs weighted by the attention distribution at a given output time step. The model was tested with standard soft attention hard monotonic attention, and MoChA with w=8.

The results shown in Table 2 indicate that using a hard monotonic attention mechanism degraded performance substantially (nearly 8 ROUGE-1 points), likely because of the strong reordering required by the task. MoChA was able to effectively halve the gap between monotonic and soft attention, despite using the modest chunk size of w=8. The results indicate the advantages of MoChA being able to deal with local reorderings.

As discussed above, the MoChA technique provides an attention mechanism which performs soft attention over adaptively-located chunks of the input sequence. MoChA allows for online and linear-time decoding, while also facilitating local input-output reorderings. Experimentally, we showed that MoChA obtains state-of-the-art performance on an online speech recognition task, and that it substantially outperformed a hard monotonic attention-based model on document summarization. The MoChA framework can be applied to additional problems with approximately monotonic alignments, such as speech synthesis and morphological inflection. The chunk size w may also vary adaptively in some implementations.

An example of an online speech recognition configuration is discussed below. Speech utterances can be represented as mel-scaled spectrograms with 80 coefficients, along with delta and delta-delta coefficients. Feature sequences were first fed into two convolutional layers, each with 3×3 filters and a 2×2 stride with 32 filters per layer. Each convolution was followed by batch normalization prior to a ReLU nonlinearity. The output of the convolutional layers was fed into a convolutional LSTM layer, using 1×3 filters. This was followed by an additional 3×3 convolutional layer with 32 filters and a stride of 1×1. Finally, the encoder had three additional unidirectional LSTM layers with a hidden state size of 256, each followed by a dense layer with a 256-dimensional output with batch normalization and a ReLU nonlinearity.

The decoder was a single unidirectional LSTM layer with a hidden state size of 256. Its input consisted of a 64-dimensional learned embedding of the previously output symbol and the 256-dimensional context vector produced by the attention mechanism. The attention energy function had a hidden dimensionality d of 128. The softmax output layer took as input the concatenation of the attention context vector and the decoder's state.

The network was trained using the Adam optimizer with $\beta_1=0.9$, $\beta_2=0.999$, and $E=10^{-6}$. The initial learning rate 0.001 was dropped by a factor of 10 after 600,000, 800,000, and 1,000,000 steps. Inputs were fed into the network in batches of 8 utterances, using teacher forcing. Localized label smoothing was applied to the target outputs with weights [0.015, 0.035, 0.035, 0.015] for neighbors at [−2, −1, 1, 2]. We used gradient clipping, setting the norm of the global gradient vector to 1 whenever it exceeded that threshold. We added variational weight noise to LSTM layer parameters and embeddings with standard deviation of 0.075 starting after 20,000 training steps. We also applied L2 weight decay with a coefficient of $10^{-6}$. At test time, we used a beam search with rank pruning at 8 hypotheses and a pruning threshold of 3.

An example of a configuration for document summarization will now be described. For summarization, we a pointer-generator technique was used. Inputs were provided as one-hot vectors representing ID in a 50,000 word vocabulary, which were mapped to a 512-dimensional learned embedding. The encoder was a single bidirectional LSTM layer with 512 hidden units, and the decoder was a single unidirectional LSTM layer with 1024 hidden units. The attention mechanisms had a hidden dimensionality d of 1024. Output words were embedded into a learned 1024-dimensional embedding and concatenated with the context vector before being fed back in to the decoder.

For training, we used the Adam optimizer with β1=0.9, β2=0.999, and E=0.0000008. Our optimizer had an initial learning rate of 0.0005 which was continuously decayed starting at 50,000 steps such that the learning rate was halved every 10,000 steps until it reached 0.00005. Sequences were fed into the model with a batch size of 64. All input sequences were truncated to a maximum length of 400 words. The global norm of the gradient was clipped to never exceed 5. Note that we did not include the "coverage penalty". During evaluation, a beam search identical to the one used in the speech recognition experiments can be used, with rank pruning at 8 hypotheses and a pruning threshold of 3.

When using MoChA, the computational cost and complexity is much less than for traditional soft attention. As expected, soft attention exhibits a roughly quadratic time complexity, whereas MoChA's computational cost and complexity is linear. This results in a larger speedup factor as T and U increase. Further, the complexity of MoChA increases linearly with w. Finally, note that for T, U=10 and w=8, the speed of MoChA and soft attention are similar, because the chunk effectively spans the entire memory. This confirms the intuition that speedups from MoChA will be most dramatic for large values of T and U and relatively small values of w.

Figure 4:
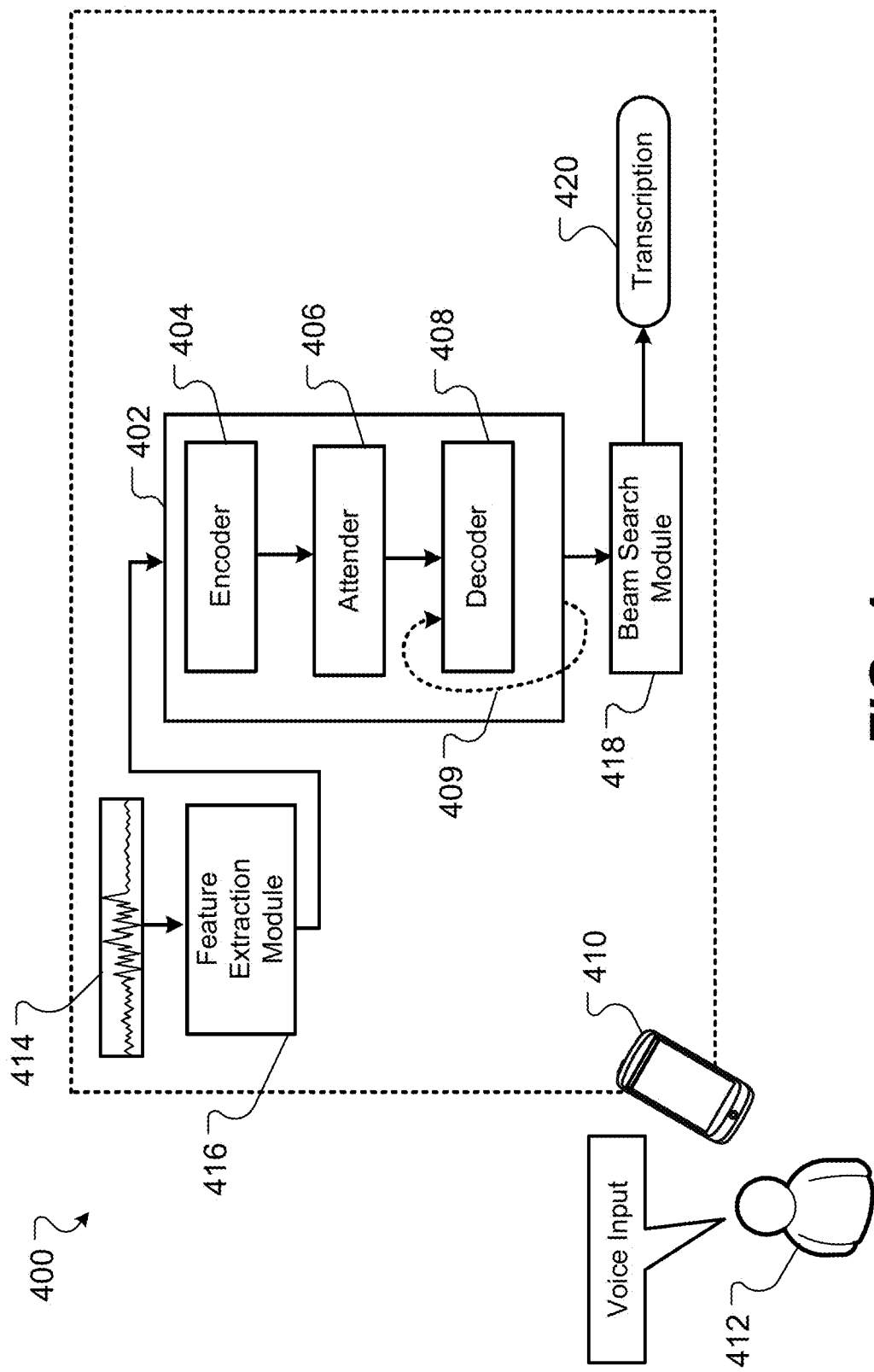
FIG. 4 is a diagram illustrating an example of a system 400 using monotonic chunkwise attention (MoChA) for speech recognition.

FIG. 4 illustrates an example of a system 400 using monotonic chunkwise attention (MoChA) for speech recognition. In the example of FIG. 4, an electronic device 410 stores and uses a speech recognition model 402 to generate a transcription for a voice input. The speech recognition model 402 includes an attention mechanism, represented by attender 406, that implements the MoChA techniques discussed above.

The electronic device 410 can be any appropriate computing device, for example, a mobile phone, a laptop computer, a desktop computer, a navigation device, a wearable device, a home automation device, an appliance, a smart speaker, a digital conversational assistant device, an entertainment device, etc.

As shown at FIG. 4, the electronic device 410 includes a microphone that detects an utterance from a user 411 and generates audio data 414 representing the utterance spoken by user 412. A feature extraction module 416 processes the audio data 414 to extract (e.g., generate) a set of feature values that are indicative of acoustic characteristics of the utterance. For example, the feature values may be mel-frequency cepstral coefficients. Sets of extracted feature values, e.g., a sequence of feature vectors, are then provided as input to the speech recognition model 402. Each set of feature values (e.g., feature vector) can represent acoustic properties of a different portion of the utterance.

The speech recognition model 402 can be an end-to-end model, for example, a model that includes functions of an acoustic model, language model, and pronunciation model. The speech recognition model 402 may thus be configured to receive acoustic information, e.g., as waveform samples or extracted features, and provide output indicative of likelihoods of language units, e.g., phonetic units (e.g., phones, context dependent phones, etc.) or orthographic units (e.g., graphemes, word pieces that may include multiple graphemes, and/or whole words).

The speech recognition model 402 can be implemented as one or more neural networks, which can be jointly trained. In some implementations, the one or more neural networks can be trained together as a single model or single neural network. In some implementations, the speech recognition model 402 includes an encoder 404, an attender 406, and a decoder 408. The speech recognition model 402 can include a softmax layer, which may be integrated with the decoder 408 or may be a separate layer that receives output from the decoder 408. Each of the encoder 404, the attender 406, and the decoder 408, as well as a softmax layer, may be implemented using one or more neural network layers. These layers can have neural network weights and/or other parameters learned through a training process, such as backpropagation of errors using a variety of training examples. In some implementations, the encoder 404, the attender 406, and/or the decoder 408 is implemented using one or more recurrent neural network layers, such as long short-term memory (LSTM) layers. The speech recognition model 402 can be implemented as a listen, attend, and spell (LAS) model or as another type of model.

During the speech recognition process, the extracted feature values are provided as inputs to the encoder 404 of the speech recognition model 402. The encoder 404 generates an encoded feature representation as an output. This encoder output is often referred to as an encoding or encoder state, and can be represented by the symbol $h^{enc}$ or $h_u$. The encoder 404 may generate an encoding for each input feature vector provided as input to the encoder 404. The encoder module 404 can perform a function similar to an acoustic model, by receiving input features and mapping them to a higher-level feature representation, $h^{enc}$. This process of generating an encoded feature representation, $h^{enc}$, can be done for each of multiple input frames, representing different input time steps. These timesteps are denoted with subscript u below. For example, the inputs can be provided over a set of input steps $\{0, 1, 2, 3, \ldots u\}$, each corresponding to an input feature vector $\{v_0, v_1, v_2, v_3, \ldots v_u\}$, which results in a corresponding set of encoding outputs $\{h_0, h_1, h_2, h_3, \ldots h_u\}$.

The output of the encoder 404 is processed using the attender 406 to generate a context vector $c_i$, as discussed above. The attender 406 can perform monotonic chunkwise attention as discussed above. In general, the attender 406 determines which features in the encodings from the encoder 404 should be attended to in order to predict the next output symbol. The output symbol, or an output distribution representing likelihoods of the output symbol can be represented by output $y_i$, discussed above. The attender 406 can generate a context output $c_i$ for each of multiple output steps i, where each output step represents a different prediction of the speech recognition model 402. For example, each output step i can represent the prediction of a different output element of an utterance being recognized, where the output elements are graphemes (e.g., characters), wordpieces, and/or whole words. For each context output vector $c_i$, the attender 406 can compute attention based on the encodings for one or more input steps u, e.g., the encoding for the current input step as well as encodings for previous input steps. For example, the attender 406 can generate an attention context output a over the set of all the encoder outputs of the utterance, e.g., the entire set $\{h_0, h_1, h_2, h_3, \ldots h_u\}$. The attention context vector c can be a vector representing a weighted summary of the current and previous encodings for frames (e.g., portions) of the utterance being recognized. The input time steps u and the output time steps i can be different, for example, so that there are multiple input time steps for each output time step, but this is not required.

The decoder 408 receives the context vector c as an input and uses it to generate an output representation, such as a distribution indicating of likelihoods of word elements.

The decoder 408 can also receive and process, along with the context vector $c_i$, one or more other inputs, such as an output of the decoder 408 for the immediately previous output time step (e.g., time step i–1) and/or an output of a softmax layer for the immediately previous output time step. For example, the decoder 408 can process inputs including context vector $c_i$ as well as output $y_{i-1}$ to generate decoder output used to create output $y_i$. The output distribution $y_i$ is a function of the decoder state $s_i$ and context vector $c_i$. The decoder state $s_i$ is a function of the previous decoder state, $s_{i-1}$, the previously emitted character, as indicated by the previous output distribution $y_{i-1}$, and the previous context vector $c_{i-1}$. More generally, the decoder state at any given output step can be based on a state or output of at least some portion of the model 402 for the immediately previous output step. This is illustrated conceptually by feedback arrow 409, and represents that the decoder 408 may receive as input output of a subsequent softmax layer or even a predicted output label determined by the beam search module to assist in generating the next output.

As an example, the decoder 408 can receive the attention context vector c output by the attender 406, as well as an embedding for the previous prediction, $y_{i-1}$, and process these in order to produce a decoder output. Although not illustrated, the model 400 may include a softmax layer that receives output of the decoder 408. In some implementations, the softmax layer is integrated with the decoder 408, so that the output $y_i$ represents both the output of the softmax layer and the decoder 408. In other implementations, the output $y_i$ represents the output of the softmax layer that is separate from the decoder 408.

The output $y_i$ can be a probability distribution, $P(y_i|y_{i-1}, \ldots, y_0, x)$, over the current sub-word unit, $y_i$, given the previous probability distributions, $\{y_{i-1}, \ldots, y_0\}$, and input feature vectors x. In some implementations, rather than use full probability distributions, information indicating specific selections of output labels can be used. The scores in output $y_i$ indicate likelihoods for each element in a set of output labels representing different word elements. For example, the decoder can provide a probability distribution that indicates posterior probabilities for each of a set of output labels.

The decoder 408 and/or an associated softmax layer may trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the decoder 408 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription. Of course, numerous variations can be made. For example, the outputs $y_i, y_{i-1}, \ldots y_0$ may each represent a selection of a specific output label rather than a distribution over all possible output labels.

Generating the transcription output for the utterance can include using beam search processing to generate one or more candidate transcriptions based on the output label scores representing probabilities of occurrence for different word elements. The system 400 also includes a beam search module 418 that performs beam search decoding to generate the candidate transcriptions from which a final transcription 420 is generated as an output of the ASR system 400.

In response to generating the transcription 420 using the speech recognition model 402, the electronic device 410 can perform any of various actions. For example, the electronic device 410 can analyze the transcription 420 to detect a hotword or command in the utterance received from user 412. In some implementations, the electronic device 410 determines whether one or more predetermined commands are present in the transcription 420, and when the command is identified the electronic device performs an action corresponding to the identified command. For example, the system 400 can identify and execute a particular command (e.g., activate a virtual assistant, play a song, set a timer, add an item to a list, and so on), change an operating mode of the electronic device 410, send the transcription 420 as a request or query to a server, provide search results generated using the transcription 420 as a query, display the transcription 420 of the utterance, or enter the transcription 420 into a text area of a user interface (e.g., during a dictation mode).

Referring again to the function of the attender 406, in some implementations, at each time step i the attender 406 generates a context vector, $c_i$, encapsulating the information in the acoustic signal needed to generate the next character. The attention model is content-based, so the contents of the decoder state $s_i$ are matched to the contents of $h_u$, representing time step u of encoding h, to generate an attention vector $\alpha_i$. Then vector $\alpha_i$ is used to linearly blend vectors $h_u$ to create context vector $c_i$.

As an example, at each decoder timestep i, the attention mechanism can compute the scalar energy $e_{i,u}$ for each time step u, using vector $h_u \in h$ and si. The scalar energy $e_{i,u}$ is converted into a probability distribution over time steps (or attention) a using a softmax function. This is used to create the context vector $c_i$ by linearly blending the listener features or encoder outputs, $h_u$, at different time steps, for example, using the equations shown below.

$$e_{i,u} = \langle \phi(s_i), \psi(h_u) \rangle$$

$$\alpha_{i,u} = \frac{\exp(e_{i,u})}{\sum_u \exp(e_{i,u})}$$

$$c_i = \sum_u \alpha_{i,u} h_u$$

Of course, the range of values that is considered and blended to generate the context vector $c_i$ can be limited by the constraints of monotonicity and chunk size as discussed above, to provide monotonic chunk-wise attention.

While the example of FIG. 4 illustrates use of the MoCha technique for speech recognition, the MoCha attention technique can be used in a wide variety of other applications, such as keyword spotting, text-to-speech synthesis, image classification, object detection, document summarization, machine translation, and so on.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers of an automated language processing system, the method comprising:
   receiving, by the one or more computers, data indicating an input sequence;
   processing, by the one or more computers, the data using an encoder neural network to generate a sequence of encodings;
   determining, by the one or more computers, a series of attention outputs with respect to the sequence of encodings using one or more attender modules,
      wherein determining each of the attention outputs comprises (i) selecting an encoding from the sequence of encodings and (ii) determining attention over a proper subset of the sequence of encodings, wherein the proper subset of encodings is determined based on a position of the selected encoding in the sequence of encodings, and
      wherein the selections of encodings are monotonic through the sequence of encodings;
   generating, by the one or more computers, an output sequence by processing the attention outputs using a decoder neural network; and
   providing, by the one or more computers, an output that indicates a language sequence determined from the output sequence.

2. The method of claim 1, wherein each of the proper subsets comprises a same number of encodings.

3. The method of claim 1, wherein selecting the encoding for each of the attention outputs comprises constraining the selection of each selected encoding to be monotonic along the sequence of encodings with respect to an immediately previously selected encoding.

4. The method of claim 1, wherein;
   each of the attention outputs corresponds to a different one of multiple output steps,
   for each output step, the selected encoding is the encoding at (i) a same position in the sequence of encodings as a particular selected encoding for the immediately previous output step or (ii) a position in the sequence of encodings that is subsequent to the position in the sequence of encodings as a particular selected encoding for the immediately previous output step.

5. The method of claim 1, wherein, for each of the attention outputs, the proper subset is a window of encodings bounded by the selected encoding for the attention output.

6. The method of claim 1, wherein the proper subsets are different positions of a sliding window that advances monotonically along the sequence of encodings for generating the series of attention outputs.

7. The method of claim 6, wherein the sliding window has a fixed size for each of the attention outputs.

8. The method of claim 1, wherein selecting the encoding from the sequence of encodings comprises determining a hard monotonic attention output.

9. The method of claim 8, wherein determining attention over each proper subset of the sequence of encodings comprises determining, based on the corresponding hard monotonic attention output, a soft attention output for a region of the encodings occurring before a location corresponding to the hard monotonic attention output.

10. The method of claim 1, wherein the one or more attender modules are configured to determine, for each of the encodings, a soft attention output for a fixed, predetermined number of segments of the encodings.

11. The method of claim 1, wherein the one or more attender modules are configured to compute hard attention outputs, such that (i) for each of the encodings, the decoder neural network attends to only a single encoded state of the encodings, and (ii) the alignment between the input sequence and output sequence is forced to be strictly monotonic.

12. The method of claim 1, wherein the one or more attender modules are configured to compute soft attention for each of the encodings, over multiple different segments of the encodings selected with respect to adaptively set locations in the encodings.

13. The method of claim 1, wherein:
   the one or more computers are part of an automated speech recognition system;
   receiving the data indicating the input sequence comprises receiving a sequence of feature vectors that indicate audio characteristics of an utterance;
   generating the output sequence comprises generating a sequence of distributions over a set of symbols that represents at least one of linguistic states, phones, characters, word pieces, or words; and
   providing the output that indicates the language sequence comprises providing, an output that indicates a transcription for the utterance.

14. The method of claim 13, wherein the automated speech recognizer performs online recognition of the utterance, such that an initial portion of the utterance is recognized and indicated while the speaker is speaking a later portion of the utterance.

15. The method of claim 1, wherein;
   the encoder neural network comprises at least one convolutional layer, at least one convolutional long short-term memory (LSTM) layer, and at least one unidirectional LSTM layer; and
   the decoder comprises a unidirectional LSTM layer.

16. The method of claim 1, wherein:
   the one or more computers are part of an automated document summarization system;
   receiving the data indicating the input sequence comprises receiving a sequence of inputs indicating text of at least a portion of a first text;
   generating the output sequence comprises generating a sequence of distributions over a predetermined word vocabulary; and
   providing the output that indicates the language sequence comprises providing, an output that indicates generated natural language text representing an automatically summarized version of at least a portion of the first text.

17. The method of claim 16, wherein;
   the encoder neural network comprises a bidirectional LSTM layer; and the decoder neural network comprises a unidirectional LSTM layer and a softmax layer that outputs a distribution over the predetermined word vocabulary.

18. The method of claim 1, wherein;
each of the attention outputs comprises a context vector representing a weighted summary of the encodings in the corresponding proper subset; and
to generate output for a particular output step, the decoder neural network is configured to receive and process the context vector and information determined from a prediction made using output of the decoder neural network for an output step immediately previous to the particular output step.

19. A system comprising:
one or more computers; and
one or more computer-readable media storing instructions that, when executed by the one or more computers, cause the one or more computers to perform operations comprising:
 receiving, by the one or more computers, data indicating an input sequence;
 processing, by the one or more computers, the data using an encoder neural network to generate a sequence of encodings;
 determining, by the one or more computers, a series of attention outputs with respect to the sequence of encodings using one or more attender modules,
 wherein determining each of the attention outputs comprises (i) selecting an encoding from the sequence of encodings and (ii) determining attention over a proper subset of the sequence of encodings, wherein the proper subset of encodings is determined based on a position of the selected encoding in the sequence of encodings, and
 wherein the selections of encodings are monotonic through the sequence of encodings;
 generating, by the one or more computers, an output sequence by processing the attention outputs using a decoder neural network; and
 providing, by the one or more computers, an output that indicates a language sequence determined from the output sequence.

20. One or more non-transitory computer-readable medium storing instructions that, when executed by one or more computers, cause the one or more computers to perform operations comprising:
 receiving, by the one or more computers, data indicating an input sequence;
 processing, by the one or more computers, the data using an encoder neural network to generate a sequence of encodings;
 determining, by the one or more computers, a series of attention outputs with respect to the sequence of encodings using one or more attender modules,
 wherein determining each of the attention outputs comprises (i) selecting an encoding from the sequence of encodings and (ii) determining attention over a proper subset of the sequence of encodings, wherein the proper subset of encodings is determined based on a position of the selected encoding in the sequence of encodings, and
 wherein the selections of encodings are monotonic through the sequence of encodings;
 generating, by the one or more computers, an output sequence by processing the attention outputs using a decoder neural network; and
 providing, by the one or more computers, an output that indicates a language sequence determined from the output sequence.

* * * * *